United States Patent
Sugawara et al.

(10) Patent No.: US 10,501,084 B2
(45) Date of Patent: Dec. 10, 2019

(54) VEHICLE CONTROL SYSTEM

(71) Applicant: Hitachi Automotive Systems, Ltd., Hitachinaka-shi, Ibaraki (JP)

(72) Inventors: Toshiharu Sugawara, Tokyo (JP); Taisetsu Tanimichi, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 20 days.

(21) Appl. No.: 15/535,203

(22) PCT Filed: Nov. 27, 2015

(86) PCT No.: PCT/JP2015/083310
§ 371 (c)(1),
(2) Date: Jun. 12, 2017

(87) PCT Pub. No.: WO2016/104042
PCT Pub. Date: Jun. 30, 2016

(65) Prior Publication Data
US 2017/0341652 A1    Nov. 30, 2017

(30) Foreign Application Priority Data
Dec. 26, 2014  (JP) .................. 2014-263807

(51) Int. Cl.
*B60W 30/18* (2012.01)
*B60W 50/14* (2012.01)
(Continued)

(52) U.S. Cl.
CPC ....... *B60W 30/18163* (2013.01); *B60R 21/00* (2013.01); *B60W 30/08* (2013.01);
(Continued)

(58) Field of Classification Search
CPC ..... B60W 30/18163; B60W 30/18145; B60W 30/095; B60W 30/08; B60W 40/105;
(Continued)

(56) References Cited

U.S. PATENT DOCUMENTS

2004/0130481 A1   7/2004   Okai et al.

FOREIGN PATENT DOCUMENTS

DE    10 2013 204 597 A1    9/2014
JP    11-345396 A    12/1999
(Continued)

OTHER PUBLICATIONS

Extended European Search Report issued in counterpart European Application No. 15872611.7 dated Jun. 7, 2018 (seventeen (17) pages).

(Continued)

*Primary Examiner* — Brian P Sweeney
(74) *Attorney, Agent, or Firm* — Crowell & Moring LLP

(57) ABSTRACT

A vehicle control system includes an external recognition means, a limit-distance calculation means, a relative-speed calculation means, and a required detection distance calculation means. When it is determined that the detectable limit distance is smaller than the required detection distance, the driver is notified that the lane change cannot be performed. When it is determined that the detectable limit distance is larger than the required detection distance, an automatic lane change of the vehicle is performed. The limit-distance calculation means detects a plurality of objects, which are sequentially detectable from the vehicle, and, based on the objects, the detectable limit distance is set in a vicinity of a farthest object.

18 Claims, 14 Drawing Sheets

(51) Int. Cl.

| | |
|---|---|
| *G05D 1/02* | (2006.01) |
| *G08G 1/16* | (2006.01) |
| *B60W 40/105* | (2012.01) |
| *B60R 21/00* | (2006.01) |
| *B60W 30/12* | (2006.01) |
| *B60W 30/16* | (2012.01) |
| *B60W 30/08* | (2012.01) |
| *B60W 30/095* | (2012.01) |
| *G08G 1/0962* | (2006.01) |
| *B60W 50/02* | (2012.01) |

(52) U.S. Cl.
CPC .......... *B60W 30/095* (2013.01); *B60W 30/12* (2013.01); *B60W 30/16* (2013.01); *B60W 30/18145* (2013.01); *B60W 40/105* (2013.01); *B60W 50/14* (2013.01); *G01S 13/931* (2013.01); *G05D 1/0214* (2013.01); *G05D 1/0223* (2013.01); *G08G 1/09623* (2013.01); *G08G 1/09626* (2013.01); *G08G 1/16* (2013.01); *G08G 1/166* (2013.01); *G08G 1/167* (2013.01); *B60W 2050/021* (2013.01); *B60W 2400/00* (2013.01); *B60W 2420/52* (2013.01); *B60W 2420/62* (2013.01); *B60W 2520/10* (2013.01); *B60W 2530/14* (2013.01); *B60W 2550/22* (2013.01); *B60W 2550/30* (2013.01); *B60W 2550/308* (2013.01); *B60W 2720/106* (2013.01)

(58) Field of Classification Search
CPC ...... B60W 50/14; B60W 30/16; B60W 30/12; B60W 2400/00; B60W 2720/106; B60W 2550/22; B60W 2420/52; B60W 2420/62; B60W 2520/10; B60W 2530/14; B60W 2050/021; B60W 2550/308; B60W 2550/30; G01S 13/931; G08G 1/166; G08G 1/167; G08G 1/09626; G08G 1/09623; G08G 1/16; G05D 1/0223; G05D 1/0214; B60R 21/00
USPC ........................................................ 701/70
See application file for complete search history.

(56) References Cited

FOREIGN PATENT DOCUMENTS

| | | |
|---|---|---|
| JP | 2009-274594 A * | 11/2009 |
| JP | 2011-134103 A * | 7/2011 |
| JP | 2014-76689 A | 5/2014 |

OTHER PUBLICATIONS

Vanholme B., "Highly Automated Driving on Highways based on Legal Safety" Doctoral school of Science and Engineering, Jun. 18, 2012, pp. 1-191, XP 55465329A, Verailles, France (218 pages).

International Search Report (PCT/ISA/210) issued in PCT Application No. PCT/JP2015/083310 dated Mar. 22, 2016 with English translation (five (5) pages).

Japanese-language Written Opinion (PCT/ISA/237) issued in PCT Application No. PCT/JP2015/083310 dated Mar. 22, 2016 (five (5) pages).

Extended European Search Report issued in counterpart European Application No. 15872611.7 dated Oct. 30, 2018 (14 pages).

Chinese-language Office Action issued in counterpart Chinese Application No. 201580055113.4 dated Jul. 25, 2019 with English translation (23 pages).

Vanholme et al., "Highly automated driving on highways based on legal safety," IEEE Transactions on Intelligent Transportation Systems, Mar. 2013, pp. 333-347, vol. 14, No. 1 (15 pages).

* cited by examiner

FIG. 4A  INDICATION BY DIRECTION INDICATOR
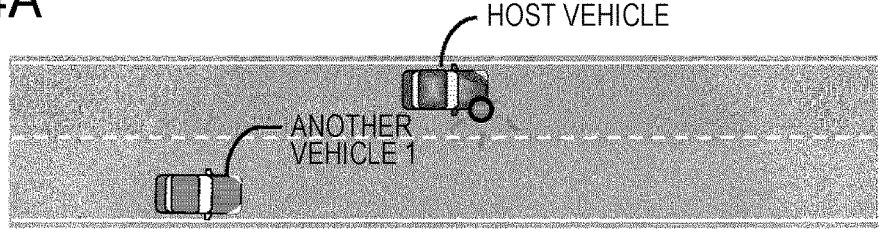
FIG. 4B  CONTROL OF HOST VEHICLE TO TRAVEL ALONG BORDER WITH ADJACENT LANE TO WHICH VEHICLE IS ABOUT TO CHANGE LANE
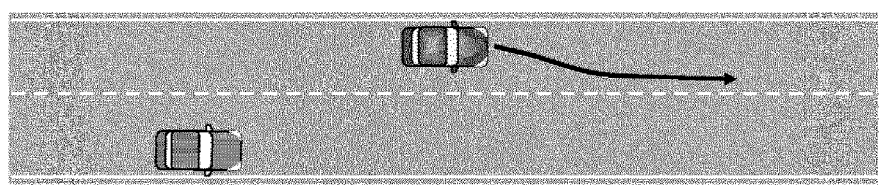
FIG. 4C  TRANSMISSION OF INFORMATION VIA INTER-VEHICLE COMMUNICATION
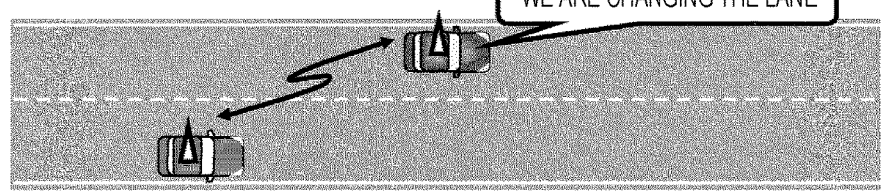

VEHICLE SPEED $V_0$ AND TIME REQUIRED FOR LANE CHANGE $T_1$

IN CASE THAT VEHICLE SPEED IS HIGH

IN CASE THAT VEHICLE SPEED IS LOW

IN CASE THAT VEHICLE SPEED IS HIGH AND DETECTABLE LIMIT DISTANCE IS SHORT

VEHICLE CONTROL SYSTEM

TECHNICAL FIELD

The present invention relates to a vehicular control system.

BACKGROUND ART

PTL 1 discloses a vehicle control device of a vehicle including an another vehicle recognition means for recognizing another vehicle traveling in a destination lane of a lane change of the vehicle, a zone detection means for detecting a recognizable zone in which the another vehicle recognition means can recognize another vehicle, a lane change time setting means for setting a longer period of lane change time for a lane change of the vehicle as the recognizable zone becomes larger, and a traveling control means for controlling the travel of the vehicle to complete the lane change within the lane change time. With the vehicle control device of PTL 1, for example, when it is detected that the recognizable zone is relatively small, it is determined that there is a possibility of presence of another vehicle which cannot be recognized even when the another vehicle is close to the vehicle and the lane change control is ended in a short time. On the other hand, when it is detected that the recognizable zone is relatively large, since another vehicle, which is away from the vehicle, can be detected and the lane change control is executed for a long period of time. In other words, according to PTL 1, the vehicle control device can preferably control the vehicle as maintaining comforts during the lane change and possibility of the lane change.

CITATION LIST

Patent Literature

PTL 1: JP 2014-76689 A

SUMMARY OF INVENTION

Technical Problem

However, there is a problem that PTL 1 does not consider a relative speed between a following vehicle coming from outside the recognizable zone and the vehicle, when the following vehicle rapidly approaches from outside the recognizable zone and the vehicle changes the lane, this may cause a contact with the following vehicle or rapid deceleration of the following vehicle.

An object of the present invention is to provide a vehicle control system of a vehicle that can maintain safety even when a following vehicle traveling in a destination lane of a lane change of the host vehicle approaches from outside a recognizable zone.

Solution to Problem

In order to solve the problem, one of preferable modes of the present invention is as follows. A vehicle control system of a vehicle, includes: an external recognition means for detecting a lane marker of a lane in which the vehicle is traveling and/or detecting another vehicle in a surrounding area of the vehicle; a limit-distance calculation means for determining a detectable limit distance of the external recognition means; a relative-speed calculation means for calculating a speed relative to a hypothetical vehicle present outside the detectable limit distance when no other vehicle is present within the detectable limit distance; and a required detection distance calculation means for determining a required detection distance of the external recognition means required for the vehicle to change lanes on the basis of the relative speed, wherein, when it is determined that the detectable limit distance is smaller than the required detection distance, the driver is notified that the lane change cannot be performed.

Advantageous Effects of Invention

According to the present invention, even when a following vehicle traveling in a destination lane of a lane change of the host vehicle approaches from outside a detectable limit distance and the host vehicle changes the lane, a contact with the following vehicle or a rapid deceleration by the following vehicle may be prevented, and this improves the safety of the vehicle control system.

BRIEF DESCRIPTION OF DRAWINGS

FIGS. 4A-4C are diagrams illustrating expressions of a lane change intention according to the first to fifth embodiments.

DESCRIPTION OF EMBODIMENTS

Hereinafter, embodiments of a vehicle control system according to the present invention will be described with reference to the drawings.

First Embodiment

In the following, a first embodiment of the vehicle control system according to the present invention will be described with reference to the drawings.

Figure 1:
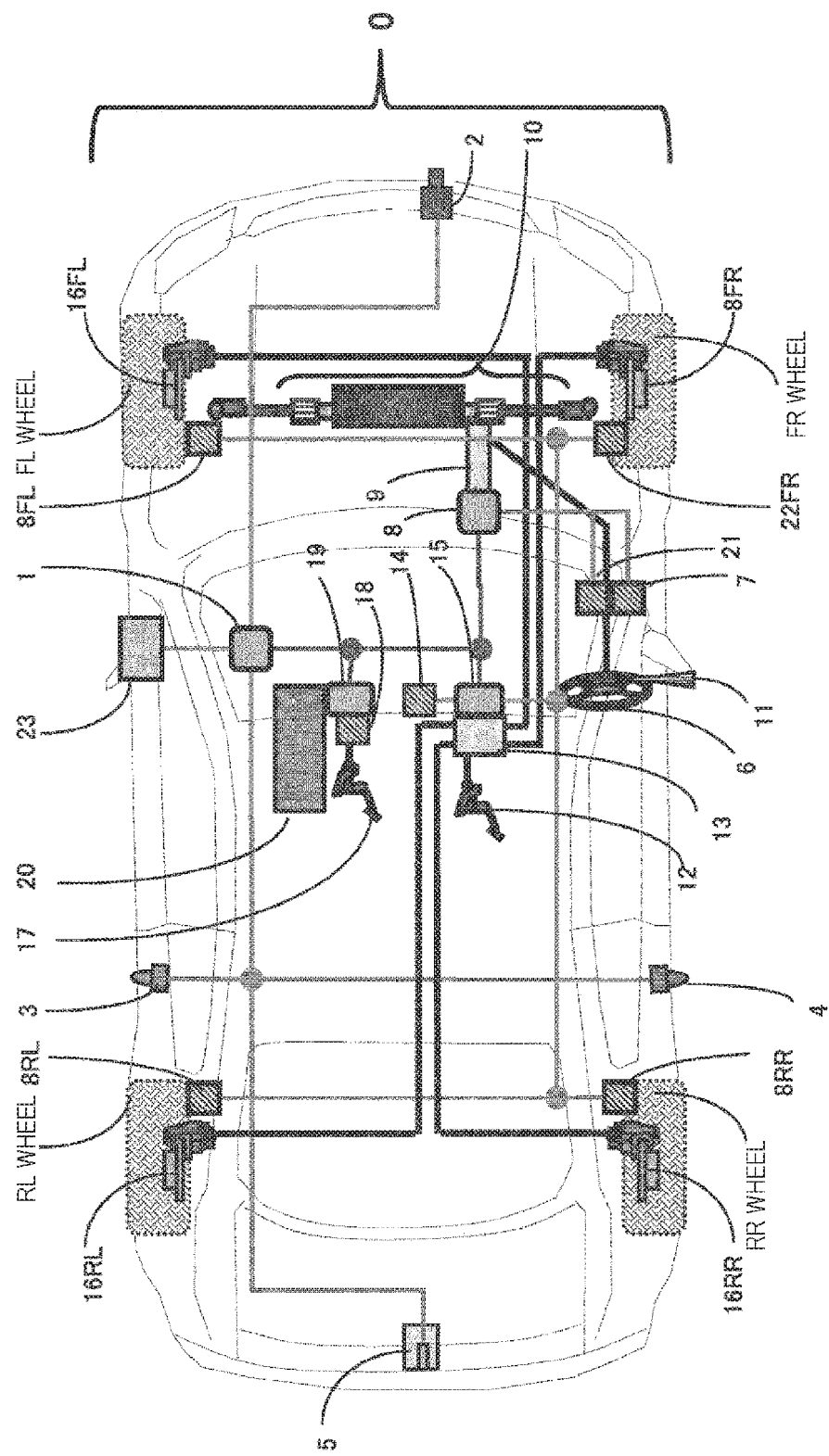
FIG. 1 is a system configuration diagram according to first to fifth embodiments.

FIG. 1 is a diagram illustrating a vehicle control system 0. Here, the FL wheel represents a left front wheel, the FR wheel represents a right front wheel, the RL wheel represents a left rear wheel, and the RR wheel is a right rear wheel, respectively.

The vehicle control system 0 includes sensors 2, 3, 4, 5 that recognize outside environment, a steering control mechanism 10 that controls to change a lane based on information from the sensors, a brake control mechanism 13, a throttle control mechanism 20, an alarm device 23, a vehicle control device 1 that calculates a command value to each actuator 10, 13, 20, a steering control device 8 that controls the steering control mechanism 10 based on the command value from the vehicle control device 1, a brake control device 15 that controls the brake control mechanism 13 based on the command value to adjust a brake force distribution, and a throttle control device 19 that controls the throttle control mechanism 20 based on the command value to adjust an engine torque output.

As sensors to recognize the outside environment, there provided are a stereo camera 2 in front, laser radars 3 and 4 in right and left sides, and a millimeter wave radar 5 in back so that a relative distance and a relative speed between the host vehicle and another vehicle in the surrounding area can be calculated. Further, the front stereo camera can detect sides of lane markers of a lane in which the host vehicle is traveling. Here, according to the present embodiment, the combination of the above sensors is described as an example of the sensor configuration; however, this example does not set any limitation and an ultrasonic sensor, a monocular camera, an infrared camera and the like may be used in combination. Signal from the sensors are input to the vehicle control device 1. Or, an input to an automatic lane change input device 11 is input to the vehicle control device 1. As the automatic lane change input device 11, for example, a direction indicator is used and an operation for supporting the lane change is determined based on the information whether the direction indicator is on or off. It is noted that the automatic lane change input device 11 is not limited to the direction indicator and a dedicated input device may be used.

Although it is not illustrated in FIG. 1, the vehicle control device 1 includes a CPU, a ROM, a RAM and an input/output device for example. The ROM stores a lane change flow, which will be explained with reference to FIG. 2. Although details are omitted here, the vehicle control device 1 calculates command values of the respective actuators 10, 13, and 20. The control devices 8, 15, and 19 of the respective actuators 10, 13, and 20 receive the command values from the vehicle control device 1 via a communication system and control the respective actuators based on the command values.

Next, a braking operation will be described. Driver's force on a brake pedal 12 is doubled by a brake booster (not illustrated) and a master cylinder (not illustrated) generates a hydraulic pressure corresponding to the force. The generated hydraulic pressure is supplied to wheel cylinder 16 via the brake control mechanism 13. Each of the wheel cylinders 16FL to 16RR is composed of a cylinder (not illustrated), a piston, a pad, and the like, and an operating fluid supplied from a master cylinder 9 pushes the piston so that the pad attached to the piston is pressed onto a disc rotor. Here, the disc rotor rotates together with the wheel not illustrated). Thus, a brake torque applied to the disc rotor works as a brake force that is applied between the wheel and a road surface. With the above configuration, according to the driver s operation on the brake pedal, a brake force is applied to each wheel.

Although it is not illustrated n FIG. 1, the brake control device 15 includes a CPU, a ROM, a RAM and an input/output device for example, similarly to the vehicle control device 1. To the brake control device 15, a brake force command from a combined sensor 14 that can detect longitudinal acceleration, lateral acceleration, and a yaw rate, wheel speed sensors 8FL to 8RR provided to each wheel, and the brake control device 15, and a sensor signal from a steering wheel angle detection device 21 from the later described steering control device 8 are input. Further, an output from the brake control device 15 is connected to the brake control mechanism 13 having a pump (not illustrated) and a control valve and an optional brake force to each wheel can be generated separately from the driver's operation on the brake pedal. The brake control device 15 serves to estimate spinning or drifting out of a vehicle or a locked wheel based on the above information, generate a brake force of a corresponding wheel to control those conditions, and improve driver's driving stability. Further, by transmitting a brake force to the brake control device by the vehicle control device 1, an arbitral brake force can be applied to the vehicle. Here, in this specification, it is not limited to the brake control device and another actuator such as a brake-by-wire system may be used.

Next, a steering operation will be described. The steering torque detection device 7 and steering wheel angle detection device 21 respectively detect steering torque and steering wheel angle input by the driver via a steering wheel 6 and the steering control device 8 controls a motor based on the information and generate assist torque. Here, although details are not illustrated in FIG. 1, the steering control device 8 includes a CPU, a ROM, a RAM, and an input/output device for example, similarly to the vehicle control device 1. When the steering torque caused by the driver and the assist torque caused by a motor are combined, the steering control mechanism 10 is activated to turn the front wheels. On the other hand, according to a steering angle of the front wheels, a reaction force from the road surface is transferred to the steering control mechanism and then transferred to the driver as a road surface reaction force.

Separately from a steering operation by the driver, the steering control device 8 generates torque with a motor 9, and the steering control mechanism 10 can be controlled. Thus, the vehicle control device 1 can control the front wheels at an arbitrary steering angle by transmitting a target steering torque to the steering control device 8. Here, according to the present invention, it is not limited to the steering control device, and another actuator such as a steer-by-wire system or the like may be used.

Next, acceleration will be described. A pressing amount of the accelerator pedal 17 by the driver is detected by the stroke sensor 18 and input to the throttle control device 8. Here, although details are not illustrated in FIG. 1, the throttle control device 19 includes a CPU, a ROM, a RAM and an input/output device for example, similarly to the vehicle control device 1. The throttle control device 19 adjusts an opening degree of a throttle according to the accelerator pedal pressing amount to control an engine. With the above configuration, the vehicle can be accelerated according to the accelerator pedal operation by the driver. Further, the throttle control device can control the throttle opening separately from the driver's accelerating operation. Thus, the vehicle control device 1 can generate arbitrary acceleration to the vehicle by transmitting target acceleration to the throttle control device 8.

With the above configuration, when the driver desires to change the lane, the vehicle control system 0 can automatically change the lane by properly controlling the speed of the host vehicle by adjusting the brake and throttle and controlling the steering according to a condition of another vehicle in the surrounding area.

Figure 2:
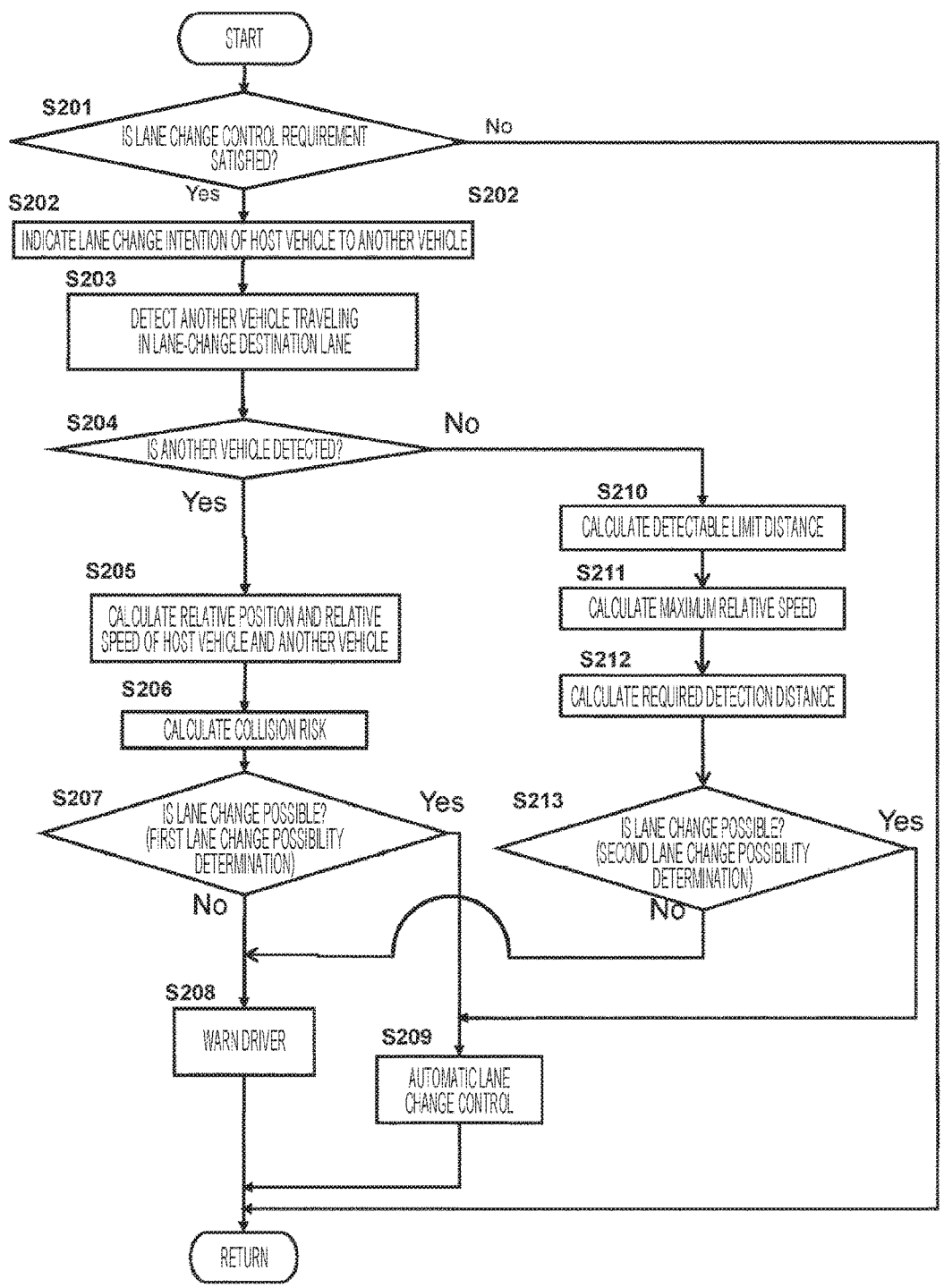
FIG. 2 is a flowchart of an automatic lane change according to the first to fifth embodiments.
Figure 3:
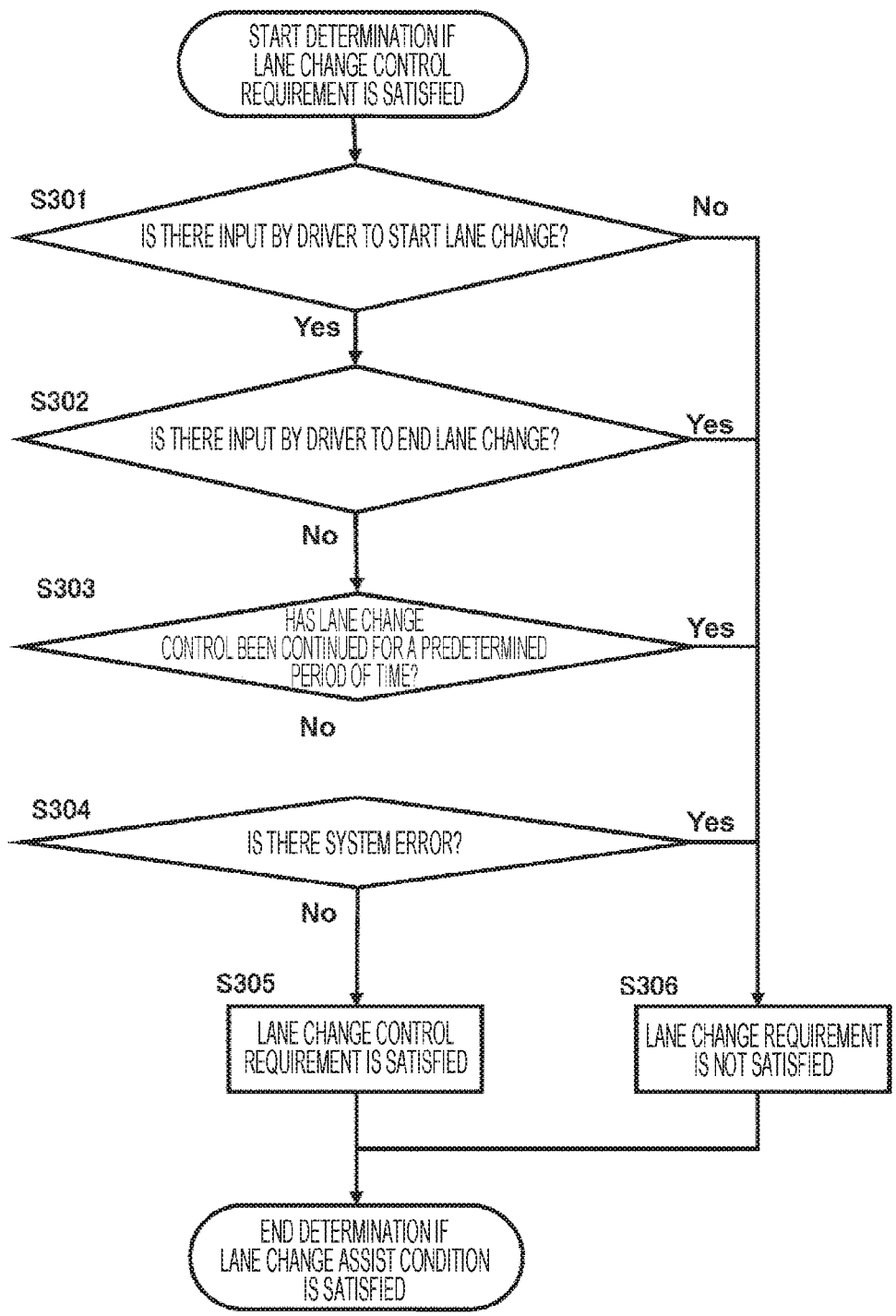
FIG. 3 is a diagram illustrating a determination whether or not a lane change control requirement is satisfied according to the first to fifth embodiments.

FIG. 2 is a flowchart of changing the lane in the vehicle control device 1. Firstly, the vehicle control device 1 determines whether or not a lane change control requirement is satisfied (S201). S201 is executed in the flowchart of FIG. 3. Firstly, it is determined whether or not there is an input by the driver to start the automatic lane change input device 11 (S301), and the process proceeds to S302 in a case of YES, and it is determined that the lane change control requirement is not satisfied in a case of NO (S306).

Next, it is determined whether or not there is an input by the driver to end the automatic lane change input device 11 (S302), and the process proceeds to S303 in a case of NO and proceeds to S306 in a case of YES.

Next, the vehicle control device 1 determines whether or not the lane change control continues longer than a predetermined period of time (S303), and the process proceeds to S304 in a case of NO and proceeds to S306 in a case of YES. With the process in S303, when a condition that the lane cannot be changed continues longer than the predetermined period of time, the lane change control can be ended and this can prevent the system from being kept activated.

Next, it is determined whether or not there is an error in the system (S304). In a case of YES, the process proceeds to S306 and it is determined that the lane change control requirement is not satisfied. In a case of NO, the process proceeds to S305 and it is determined that the lane change control requirement is satisfied. As described above, based on the results in S301 to S306, it is determined whether or not the lane change control requirement is satisfied in S201.

The process proceeds to S202 in a case of YES in S201, and the process proceeds to a return process in a case of NO. In the return process, the process proceeds to the beginning of the flow of FIG. 2 after a predetermined period of time (from tens of milliseconds to hundreds of milliseconds) has passed. In other words, it is always monitored whether or not the lane change control requirement is satisfied and, when the requirement is satisfied, the lane change control is started.

Next, the vehicle control device 1 performs a process to indicate to another vehicle that the host vehicle desires to change the lane as illustrated in FIGS. 4(*a*) to 4(*c*) (S202). As a method to indicate to another vehicle that the host vehicle desires to change the lane, there is a method to turn on a direction indicator as illustrated in FIG. 4(*a*). In addition, there is a method to control the vehicle to travel along border of an adjacent lane to which the vehicle desires to travel as illustrated in FIG. 4(*b*). To realize the above control, the vehicle control device 1 detects the lane by using the information from the stereo camera 2 mounted in the front. Then, a vehicle speed of the later described host vehicle and a target yaw moment needed for the vehicle are calculated based on the lane information. A target steering angle or a target yaw moment is calculated based on the target yaw moment and transmitted to the steering control device 8 and brake control device 15 respectively. With the above configuration, the vehicle can be controlled to travel along the border with the adjacent lane. The method for controlling the vehicle to travel along the border of the adjacent lane is not limited to the above method and may be another method. In addition, as a method to indicate to another vehicle that the host vehicle desires to change the lane, there may be a method to transmit an intention to change the lane from the host vehicle to another vehicle via inter-vehicle communication illustrated in FIG. 3(*c*). As described above, with the process in S202, since the intention of the driver to change the lane is clearly informed to another vehicle, the another vehicle can recognize the intention of the host vehicle to change the lane and the lane change can be smoothly performed. Further, the timing of the process to indicate the intention of the host vehicle to change the lane to another vehicle may be changed according to a result of a later described a first lane change possibility determination (S207), a second lane change possibility determination (S213) or the like. When it is determined or predicted that the lane change cannot be performed, by indicating the intention to change the lane at an earlier timing than the case that it is determined that the lane change is possible, the another vehicle can be made to recognize the intention to change the lane and be encouraged to give a space for the lane change by the vehicle so that the lane change can be smoothly performed.

Next, the vehicle control device 1 detects, with the sensors 2, 3, 4 and 5 that recognize the outside environment, another vehicle traveling in the destination lane of the lane change of the host vehicle (including another vehicle that is going to merge into the destination lane of the lane change of the host vehicle) (S203).

Next, the vehicle control device 1 determines whether or not another vehicle is detected (S204). The process proceeds to S205 when another vehicle is detected and proceeds to S210 when no other vehicle is detected.

Figure 5:
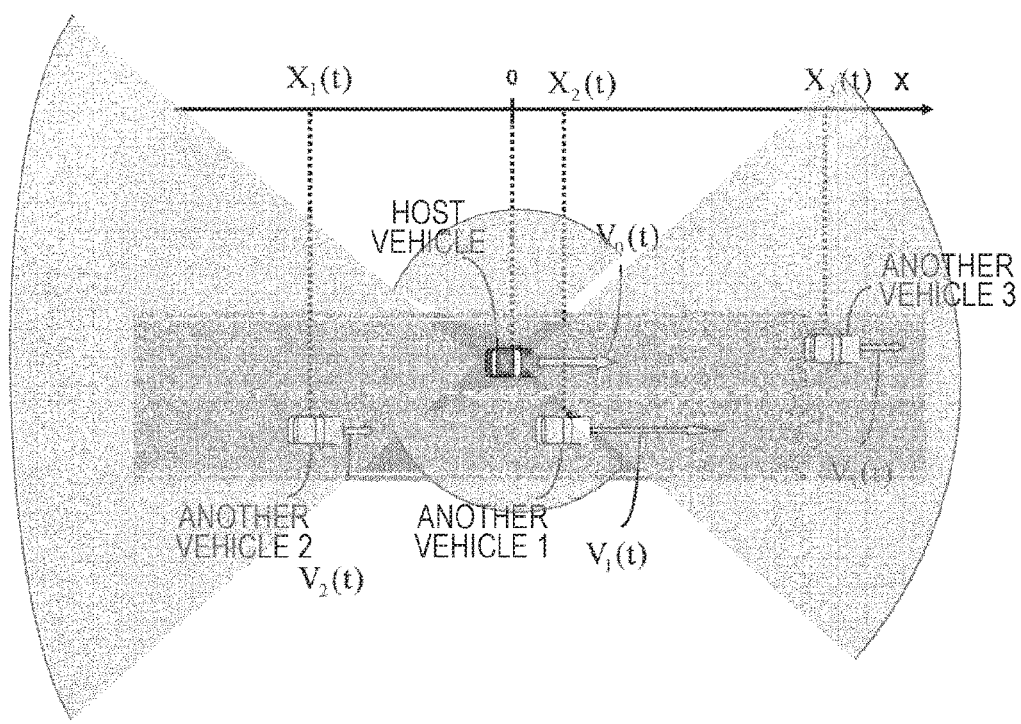
FIG. 5 is a diagram illustrating positions and speeds relative to other vehicles in a surrounding area according to the first to fifth embodiments.

In S205, as illustrated in FIG. 5, the stereo camera 2 for detecting a condition in front of the vehicle, the laser radars 3 and 4 for detecting a condition in right and left sides of the vehicle, and the millimeter wave radar 5 for detecting a condition in back of the vehicle calculate a relative distance and a relative speed between the host vehicle and another vehicle in the surrounding area. Firstly, a speed of the host vehicle is estimated according to the wheel speed sensors 22FL to 22RR. In this process, for example, a lowest value in the four wheel speed sensors is selected and used as the estimated vehicle speed. Here, the vehicle speed estimation method is not limited to the above method and another method, which uses an average value of the wheel speed sensors, for example, may be employed. The position and speed relative to the another vehicle is represented in a coordinate system with an origin as a centroid position of the vehicle and an X-axis indicating a front direction of the vehicle. The relative distance $X_i$ and relative speed $V_i$ between the centroid of the host vehicle and the centroid of the another vehicle in the surrounding area in the X-axis direction at time t second can be represented as follows $$\begin{cases} X_i(t) \\ V_i(t) = \dot{X}_i(t) \end{cases} (i = 1, 2, \ldots, i) \quad (1)$$

Figure 6:
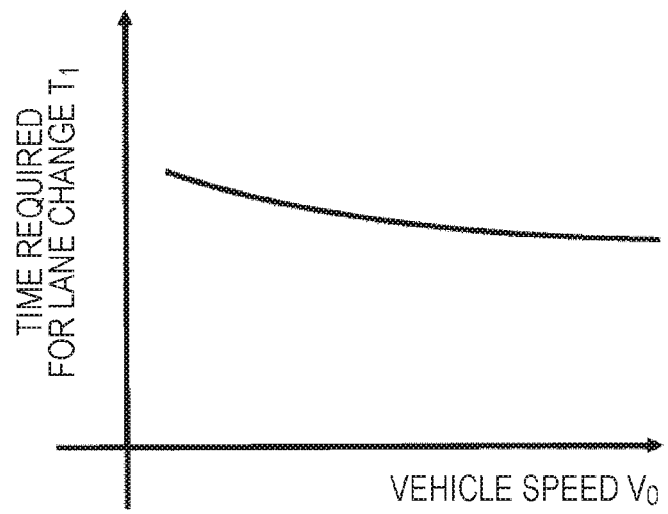
FIG. 6 is a diagram illustrating a relationship between a vehicle speed V0 and Time T1 required for lane change according to the first to fifth embodiments.

Next, based on the relative position and relative speed, a collision risk in a case of the lane change is calculated (S206). First, the vehicle speed estimated above is input to a graph of the vehicle speed and the time required for the lane change illustrated in FIG. 6 and the time required for the lane change is calculated. In the graph of FIG. 6, the time required for the lane change is set to be smaller as the vehicle speed increases. With this configuration, the time required for the lane change becomes shorter with a higher speed and, on the other hand, the time becomes shorter with the lower speed. Accordingly, time $T_1$ required for the lane change can be properly calculated according to the vehicle speed. Next, based on the calculated Time $T_1$ required for the lane change, an inter-vehicle distance $X_i^{gap}$ (t+$T_1$) and a collision prediction time $T_i^{ttc}$ (t+$T_1$) that represents a collision risk if the lane change is performed (at timing after Time $T_1$ required for the lane change) are calculated by using the following expressions.

$$X_i^{gap}(t + T_1) = |X_i(t + T_1)| - (L_0/2 + L_i/2) \quad (2)$$

$$T_i^{ttc}(t + T_1) = \begin{cases} \dfrac{X_i^{gap}(t + T_1)}{V_i(t + T_1)} & (V_i > 0) \\ \infty & (V_i \leq 0) \end{cases} \quad (3)$$

Here, the symbol $L_0$ represents the length (in the front-back direction) of the host vehicle and the symbol $L_i$ represents the length of another vehicle i in the surrounding area.

Figure 7:
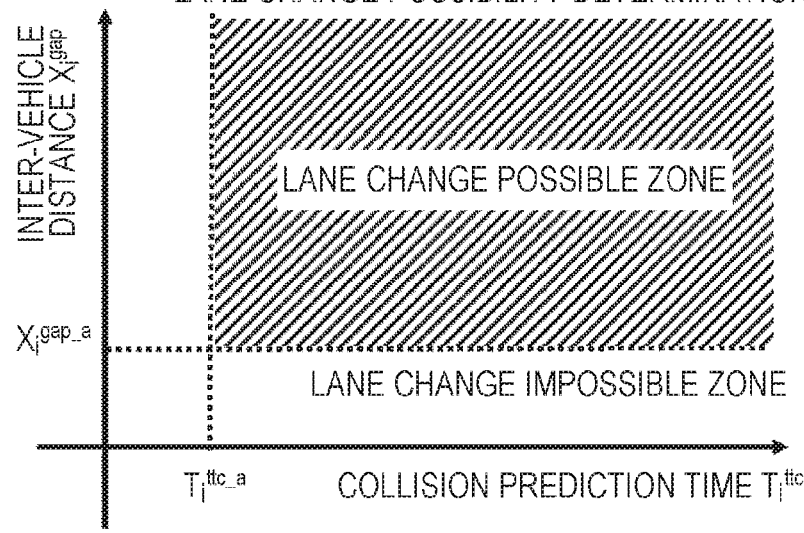
FIG. 7 is a diagram illustrating a first lane change possibility determination according to the first to fifth embodiments.

Next, with reference to FIG. 7, it is judged whether or not the lane change is possible based on the inter-vehicle distance $X_i^{gap}$ (t+$T_1$) and collision prediction time $T_i^{ttc}$ (t+$T_1$) obtained by using the expressions (2) and (3) (S207). The lane change possibility determination is referred to as a first lane change possibility determination. In FIG. 7, the vertical axis represents the inter-vehicle distance and the horizontal axis represents the collision prediction time. As the judgment criteria, it is judged that the lane change can be performed only when there are sufficient relative distances and sufficient collision prediction times of all vehicles in the surrounding area, which means, when the following expression are satisfied, and it is judged that the lane change cannot be performed in other cases.

$$X_i^{gap}(t+T) > X_i^{gap\_a}$$

$$T_i^{TTC} > T_i^{TTC\_a} \quad (4)$$

The symbol $X_1^{gap\_a}$ represents a threshold value (hereinafter, referred to as a first predetermined value) of the relative distance whether the lane change is possible with respect to a preceding vehicle in a space to perform a lane change (hereinafter, referred to as a target space), and the symbol $X_2^{gap\_a}$ represents a threshold value (hereinafter, referred to as a third predetermined value) of the relative distance whether the lane change is possible with reference to a following vehicle in the target space. The first to third predetermined values are preferably a distance that the driver does not change the lane in the relative distance regardless of the relative speed (for example, the first predetermined value is 7 m and the third predetermined value is 10 m). Here, those values may not be fixed values and may be changed according to the vehicle speed or by the driver. On the other hand, the symbol $T_1^{TCC\_a}$ represents a threshold value (hereinafter, referred to as a second predetermined value) of a collision prediction time whether the lane change is possible with respect to the preceding vehicle in the target space, and the symbol $T_2^{TTC\_a}$ represents a threshold value (hereinafter, referred to as a fourth predetermined value) of a collision prediction time whether the lane change is possible with respect to the following vehicle in the target space. The second and fourth predetermined values are preferably the time that the driver senses danger with this collision prediction time (for example, the second predetermined value is 5 S, and the fourth predetermined value is 6 S). Here, similarly, these values may not be fixed and may be changed according to the vehicle speed or by the driver. With this determination criteria, for example, when the lane is about to be changed in a condition with a large relative distance and a short collision prediction time (a large relative speed), that is, when the following vehicle approaches to the host vehicle soon after changing the lane, it is determined that the lane change cannot be performed. Further, even when the relative speed is negative, that is, the another vehicle is leaving away, it can be determined that the lane change cannot be performed if the relative distance is short. When it is determined that the lane change is possible in the above determination, the process proceeds to an automatic lane change control in S209. On the other hand, when it is determined that the lane change cannot be performed, the process proceeds to a process to warn the driver in S208. Here, the lane change possibility determination is not limited to the example in FIG. 7 and, for example, there may be a configuration that the horizontal axis in FIG. 7 represents the relative speed as a substitute.

Figure 8:
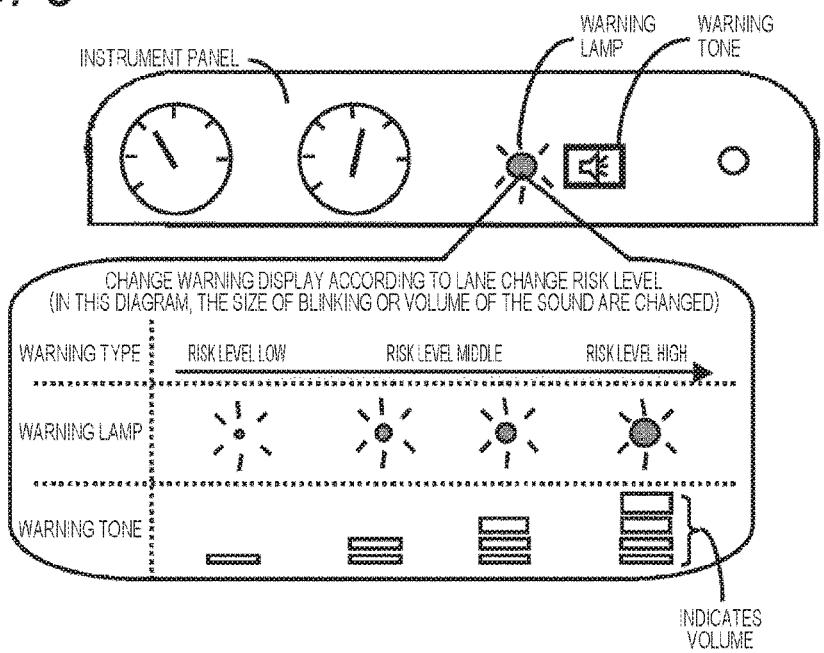
FIG. 8 is a diagram illustrating an alarm process to a driver according to the first to fifth embodiments.

Next, in the process to warn the driver in S208, as illustrated in FIG. 8, according to the risk (the collision prediction time or inter-vehicle distance), the intensity of the warning lamp or the volume of the warning tone of the warning device 8 are changed to inform of the driver that the lane change cannot be performed. Since the display and tone volume are changed according to the risk levels, the driver can more clearly recognize the surrounding condition.

Figure 9:
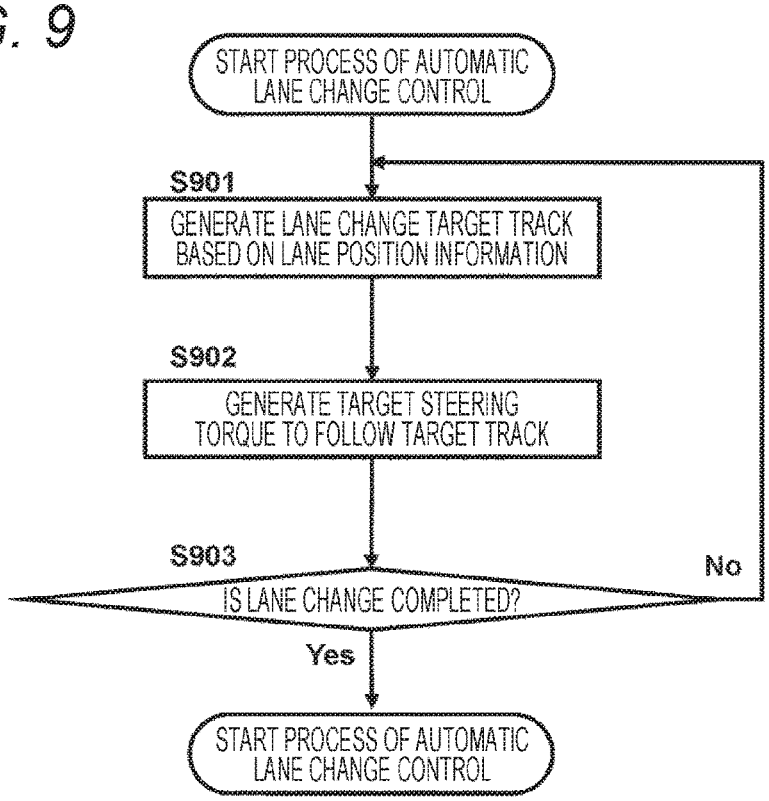
FIG. 9 is a flowchart of an automatic lane change control according to the first to fifth embodiments.

When it is determined that the lane change is possible in the first lane change possibility determination, an automatic lane change control illustrated in FIG. 9 is performed (S209). Firstly, based on the lateral location of the lane, a target track of the lane change is generated (S901). Next, a target steering torque is generated to follow the target track and output to the steering control device 8 (S902). Sequentially, it is determined whether the lane change is completed based on the lateral location of the lane, the automatic lane change control ends when it is determined that the lane change is completed, and the process returns to S901 when the lane change is not completed. The above description is a lane change process in a case that another vehicle is detected.

Figure 10:
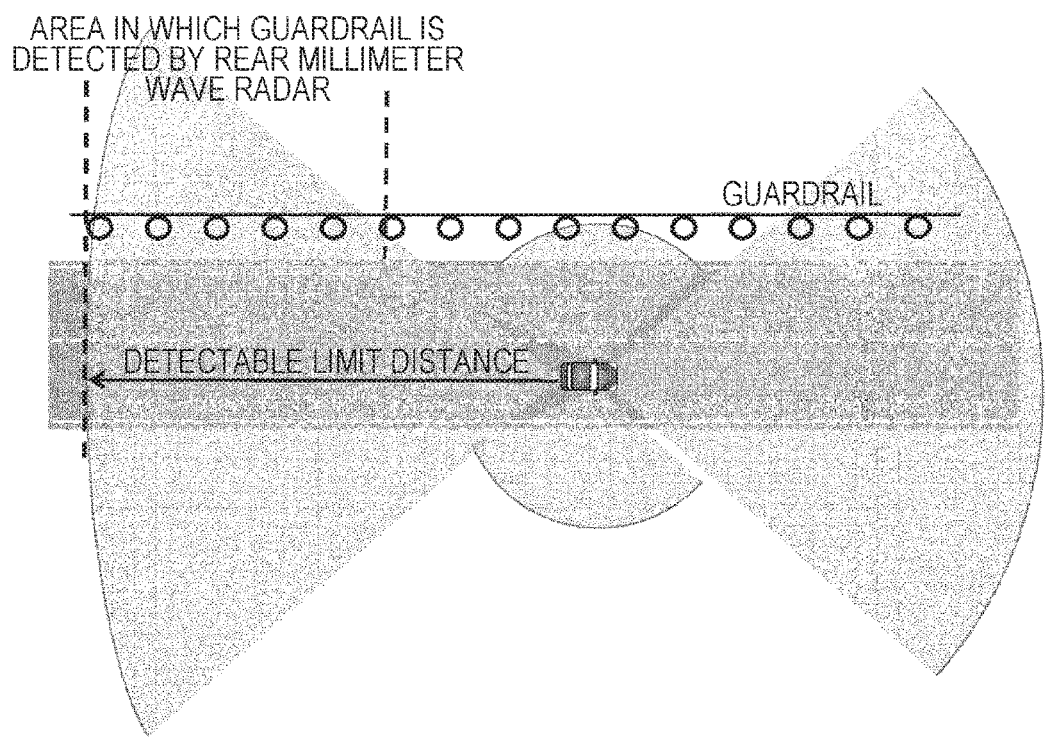
FIG. 10 is a diagram illustrating a detectable limit distance setting method according to the first to third embodiment.

Next, a lane change process in a case that another vehicle is not detected will be explained. In S204, when it is determined that another vehicle is not detected, the process proceeds to S210. In S210, as illustrated in FIG. 10, from subjects (including road surface paintings) which can be continuously detected by the sensors, a farthest subject is set as a detectable limit distance (S210). In the example of FIG. 10, the farthest position of a guardrail which is seen is set as a detectable limit distance. Here, a detectable limit distance setting method is not limited to the above method, a farthest subject may be set as a detectable limit distance, or a farthest subject from objects, which are difficult to see, with a reflection ratio may be set as a detectable limit distance. When the detectable limit distance is limited to a farthest subject among the subjects which are difficult to see, the safety will be improved.

Figure 11:
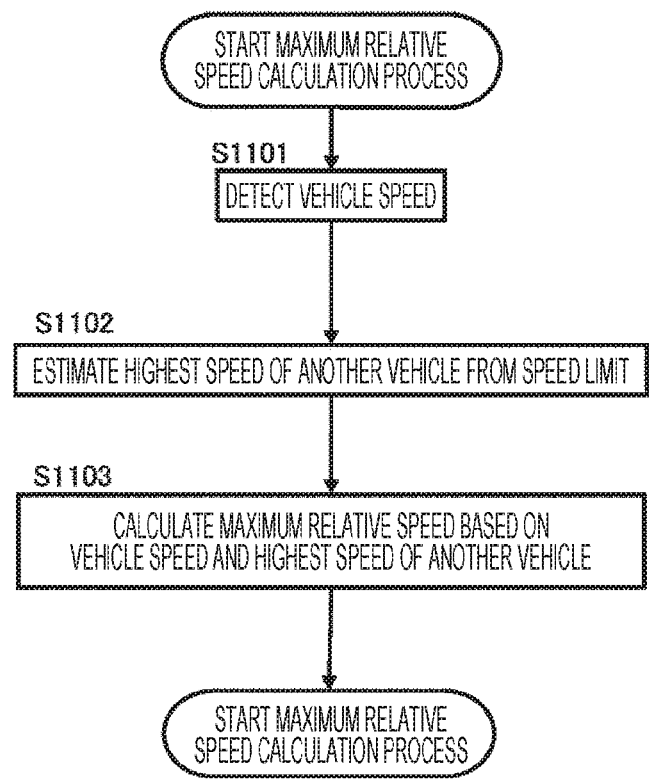
FIG. 11 is a flowchart of calculating a maximum relative speed according to first, third to fifth embodiments.

In S211, a maximum relative speed calculation process illustrated in FIG. 11 is performed. Firstly, a vehicle speed is calculated with the above method (S1101). Then, a speed limit of the lane in which the host vehicle is traveling is extracted from an unillustrated navigation system, and a highest speed of another vehicle (a hypothetical vehicle) as a worst case is estimated by adding a safety margin to the speed limit of the lane (S1102). Here, the method to estimate the speed limit of the another vehicle is not limited to the above method, and the speed limit of the another vehicle may be estimated by detecting signs and paintings with an in-vehicle camera, recognizing the speed limit of the lane, and adding a safety margin to the speed limit of the lane. Next, in S1103, based on the vehicle speed and the another vehicle's speed limit, a considerable maximum relative speed of the host vehicle and the another vehicle is calculated.

Figure 12:
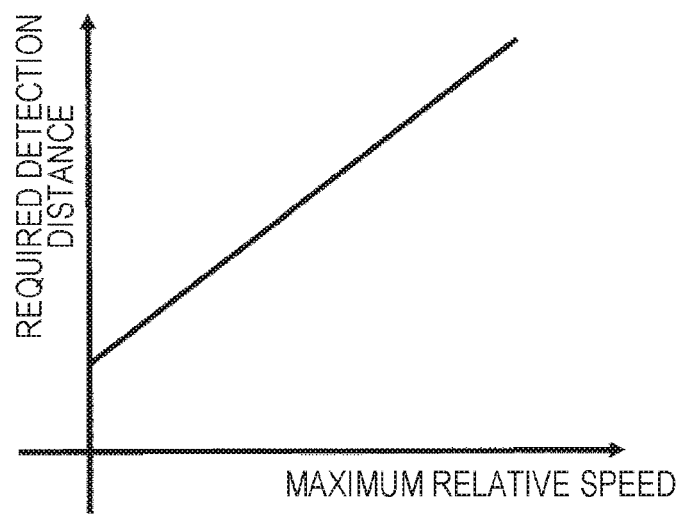
FIG. 12 is a diagram illustrating a relationship between a maximum relative speed and a required detection distance according to the first to fifth embodiments.

Next, in S212, by using the graph of FIG. 12, a required detection distance is obtained based on the maximum relative speed. Here, the required detection distance is a detection distance of a sensor required for a lane change without a collision and a rapid deceleration when a following vehicle approaches traveling in a maximum relative speed from outside the detectable limit distance. With the above process, as the maximum relative speed becomes higher, a larger required detection distance can be set.

Next, in S213, a lane change possibility determination is performed based on the detectable limit distance and required detection distance. This lane change possibility determination is referred to as a second lane change possibility determination. When the detectable limit distance is larger than the required detection distance, that is, when an actual detection distance by the sensor is larger than the detection distance by the sensor required to perform the lane change, it is determined that the lane change can be performed. On the other hand, when the detectable limit distance is smaller than the required detection distance, it is determined that the lane change cannot be performed. When it is determined that the lane change cannot be performed in the second lane change possibility determination, the process proceeds to above described S208 and, when it is determined that the lane change can be performed, the process proceeds to above described S209.

Characteristics of the present application are especially the processes in S204 and S210 to S213 in FIG. 2. In other words, when another vehicle in the destination lane of the lane change is not detected, a detectable limit distance of the vehicle and a required detection distance required for the lane change without a collision or a rapid deceleration are calculated and, when the detectable limit distance is smaller than the required detection distance, it is determined that the lane change cannot be performed and the driver is notified that the lane change cannot be performed. With this configuration, even when another vehicle traveling in the destination lane of the lane change rapidly approaches from outside the recognizable zone, the safety can be maintained.

Figure 13A:
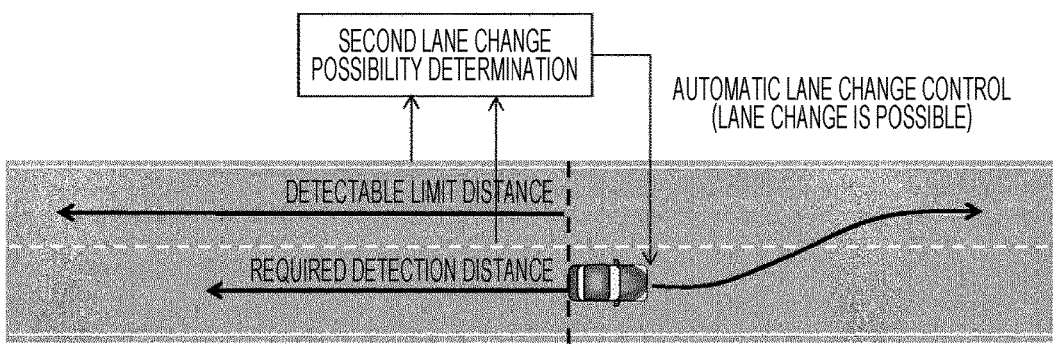
FIGS. 13A and 13B are diagrams illustrating operation results of the vehicle control system according to the first to third embodiments.
Figure 13B:
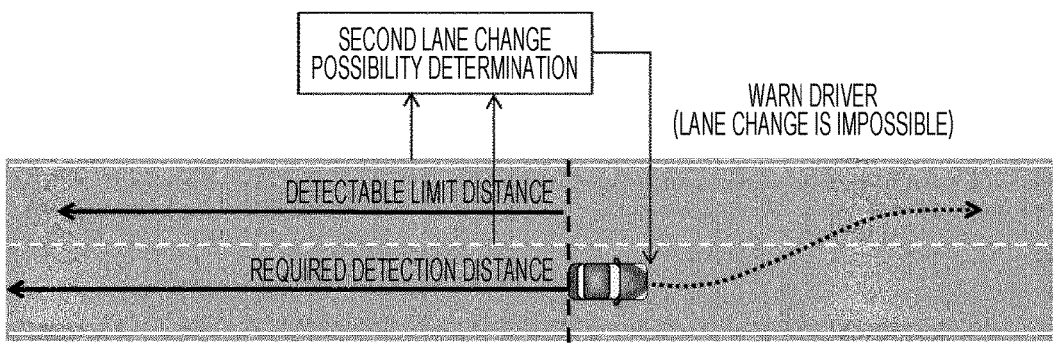

FIG. 13 illustrates an operation of the vehicle to which the vehicle control system is applied. When the vehicle speed is high, as illustrated in FIG. 13, the required detection distance becomes small and the detectable limit distance becomes larger than the required detection distance. Thus, in the second lane change possibility determination, it is determined that the lane change is possible and the automatic lane change control is performed. On the other hand, when the vehicle speed is low, since the required detection distance becomes larger, it is determined that the lane change cannot be performed in the second lane change possibility determination, the driver is warned by using a difference between the required detection distance and detectable limit distance as a risk, and the driver is notified that the lane change cannot be performed. In addition to the warning, the automatic driving may be switched to driver's manual driving.

Figure 14:
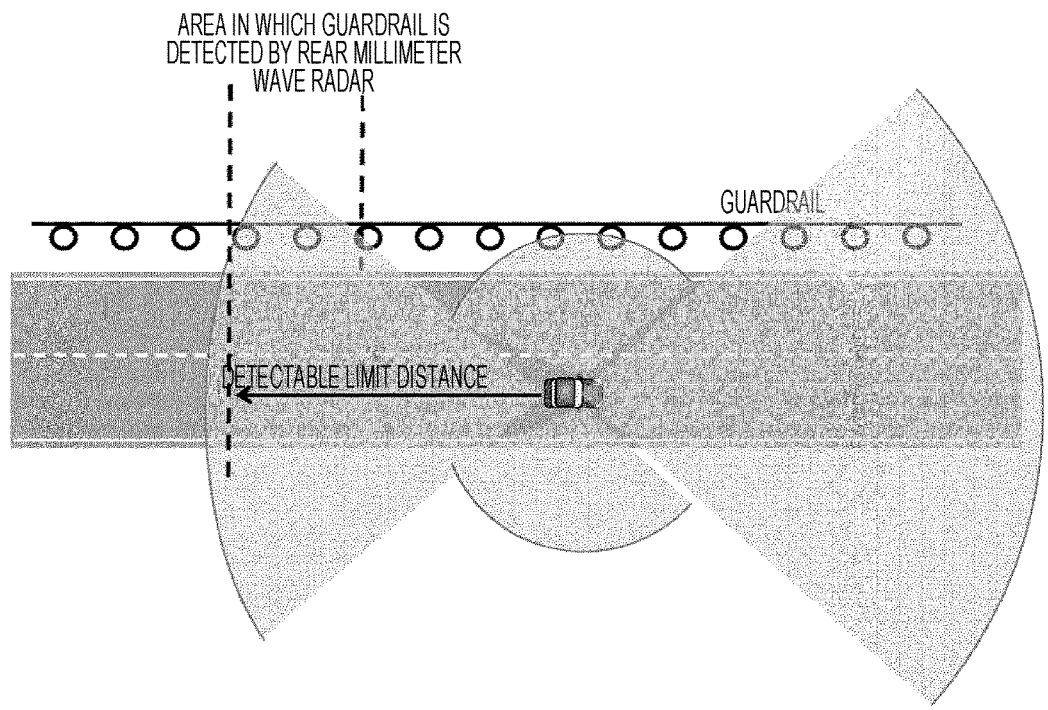
FIG. 14 is a diagram illustrating a detectable limit distance setting method under a disturbance condition according to the first embodiment.

FIG. 14 illustrates a method for setting a detectable limit distance in a case a disturbance such as a foggy condition occurs. Compared to FIG. 10 with fewer disturbances, the detectable limit distance is made to be shorter.

Figure 15:
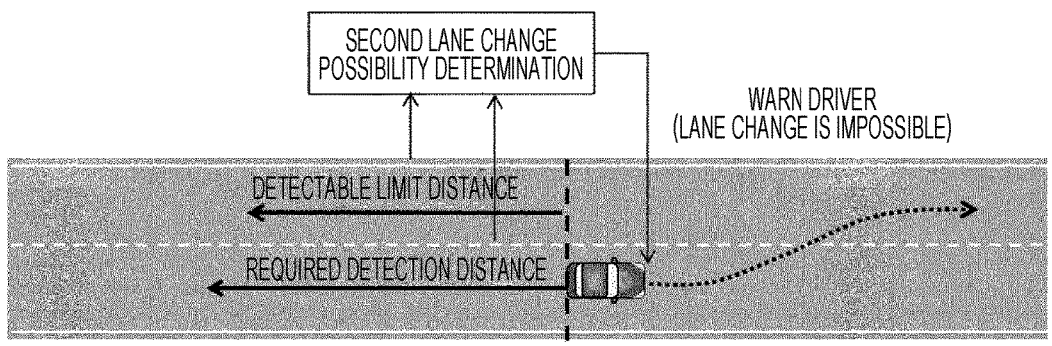
FIG. 15 is a diagram illustrating an operation result of the vehicle control system under a disturbance condition according to the first embodiment.

FIG. 15 illustrates an operation of the vehicle to which the vehicle control system is applied in a case that the condition becomes foggy. Compared to FIGS. 13(a) and 13(b) the required detection distance is not changed but the detectable limit distance is made to be shorter. As a result, it is determined that the lane change cannot be performed in the second lane change possibility determination and the driver is warned. Although it has been explained with an example of a foggy condition, the vehicle control system can be applied in a case of other types of disturbances caused by a change in the environment due to rain, night, or the like, a change of traveling condition at a point at a curve or where the gradient changes or at an inlet or outlet of a tunnel for example.

The vehicle control device of the vehicle control system according to the above described present embodiment will be particularly described. Firstly, the vehicle control system includes an external recognition unit (the stereo camera 2, laser radars 3, 4, and millimeter wave radar 5) that detects outside environment information of the host vehicle. Then, a control unit of the vehicle control device 1 includes a relative speed calculation unit, as a function, for calculating a relative speed between a hypothetical vehicle being outside the detectable area and the host vehicle when the external recognition unit does not recognize another vehicle in the detectable area. Further, the vehicle control system includes a notification unit for determining whether or not the lane change can be performed based on the relative speed calculated by the relative speed calculation unit and notifying the driver of the determination result.

Here, a control unit of the vehicle control device 1 includes a relative speed calculation unit for calculating a relative speed between another vehicle and the host vehicle when the another vehicle is recognized by the external recognition unit, and a notification unit for determining whether or not the lane change can be performed based on the relative speed calculated by the relative speed calculation unit and notifying the driver of the vehicle of the determination result.

Further, the control unit of the vehicle control device 1 includes a detection area calculation unit for calculating an area detectable by the external recognition unit, and an another vehicle recognition unit for recognizing another vehicle based on whether or not there is another vehicle in the detectable area calculated by the detection area calculation unit.

Further, the control unit of the vehicle control device 1 calculates a relative speed between a hypothetical vehicle outside the detectable area and the host vehicle when the external recognition unit does not recognize another vehicle in the detectable area. Thus, it is preferable to determine whether or not the lane change can be performed based on the calculated relative speed and notify the determination result to the driver of the host vehicle.

Further, the control unit of the vehicle control device 1 includes a required detection distance calculation unit for calculating a required detection distance of an external recognition unit required for the lane change by the vehicle based on the relative speed calculated by the relative speed calculation unit. Thus the notification unit notifies the driver of the vehicle that the lane Change cannot be performed or can be risky when it is determined that the calculated required detection distance is larger than a limit of the detectable area of the external recognition unit.

In this case, a control unit of the vehicle control device 1 may include a lane change control unit for controlling to perform an automatic lane change of the vehicle. Or, the control unit of the vehicle control device 1 may include a vehicle speed control unit for controlling to perform automatic acceleration of the vehicle. Further, as described above, the relative speed calculation unit preferably calculates a relative speed between the hypothetical vehicle and the host vehicle based on the speed limit of the lane.

Further, the control unit of the vehicle control device 1 is to set a vicinity of a farthest recognized object among the recognized objects recognized by the external recognition unit as a limit of the detectable area of the external recognition unit and determine whether or not the lane change can he performed based on the limit of the detectable area of the external recognition unit. More specifically, when it is determined that the required detection distance is smaller than the limit of the detectable area of the external recognition unit, it is determined that the lane change of the vehicle can be performed.

With the above configuration, according to the present invention, it is determined whether or not the lane change can be performed based on the detectable limit distance and required detection distance and, when it is determined that the detectable limit distance is smaller than the required detection distance, that is, when the safety cannot be confirmed, the lane change is not performed and the driver is notified that the lane change cannot be performed. As a result, even when another vehicle traveling in the destination lane of the lane change rapidly approaches from outside the detectable limit distance, it is prevented that the vehicle changes the lane and comes into contact with the following vehicle or force the following vehicle decelerate rapidly and this improves the safely of the vehicle control system. Further, the present invention can provide similar effect even when the detectable limit distance becomes shorter due to various disturbances such as a foggy condition.

Second Embodiment

The present embodiment is a vehicle control system that sets a maximum relative speed based on a speed distribution of a lane to which the vehicle is about to travel. Regarding the parts having the same function as those in the first embodiment, the explanation thereof will be omitted.

Figure 16:
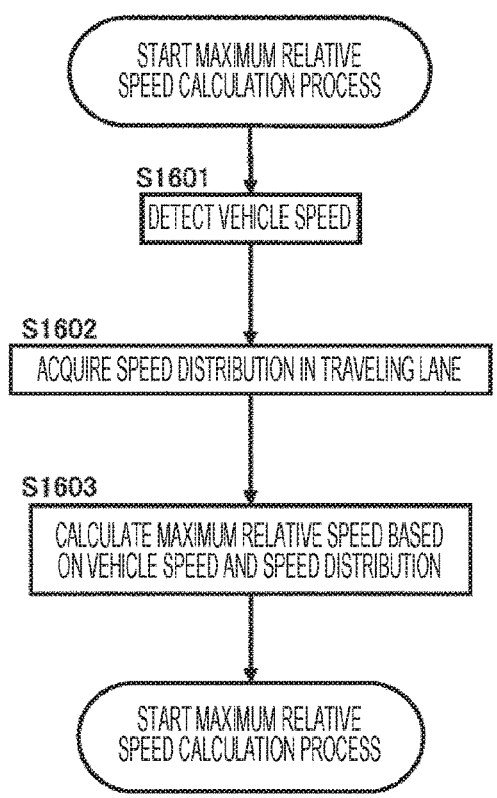
FIG. 16 is a flowchart of calculating a maximum relative speed according to the second embodiment.

FIG. 16 illustrates a flowchart of calculating a maximum relative speed according to the second embodiment. First, a vehicle speed is calculated (S1601). Based on map data storing a speed history of a location where the host vehicle is traveling, a highest speed of another vehicle (a hypothetical vehicle) is estimated (S1602). Here, the map data storing the speed history of the lane is preferably updated based on the data of actual traveling in a sequential manner.

An unillustrated telematics center and each vehicle are connected via an unillustrated information terminal. The telematics center stores and manages travelling speeds of each vehicle as map data. In other words, the map data stores speed distribution that each vehicle travels in actual. Each vehicle periodically acquires the map data. Here, the above described map data management method is not limited to the above description and another method may be employed. Next, in S1603, based on the vehicle speed of the speed limits of another vehicle, a considerable maximum relative speed between the host vehicle and another vehicle is calculated.

In other words, according to the present embodiment, a relative speed calculation unit of the control unit of the vehicle control device 1 calculates a relative speed between the hypothetical vehicle and host vehicle based on the history of the traveling speed of the lane.

As described above, based on the speed distribution of the lane to which the vehicle is about to travel, an estimation accuracy can be improved by estimating a highest speed of another vehicle, compared to a case of estimating a highest speed of the lane based on the lane speed limit. As a result, the accuracy of the second lane change possibility determination is improved and the safety is also improved.

Third Embodiment

The present embodiment is a vehicle control system in which the acceleration is controlled when it is determined that the lane change cannot be performed in the second lane change possibility determination so that the lane change can be performed in more situations. Regarding the parts having the same function as those in the first embodiment, the explanation thereof will be omitted.

Figure 17:
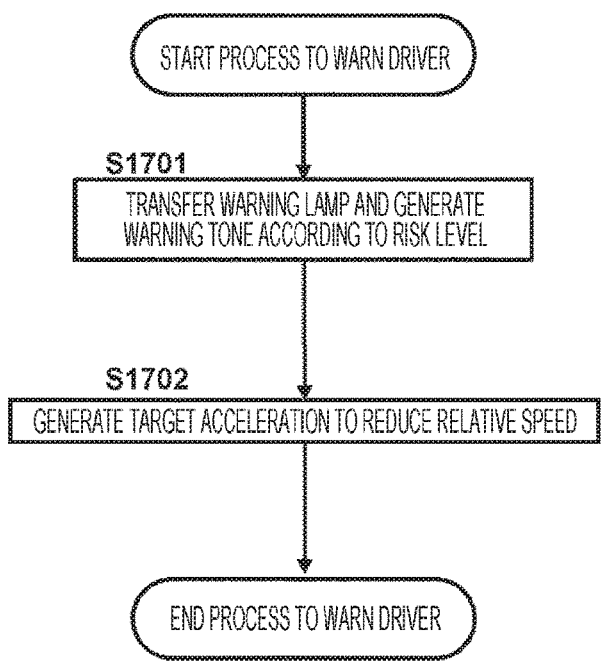
FIG. 17 is a flowchart illustrating a warning process to a driver according to the third embodiment.

According to the third embodiment, when it is determined that the lane change cannot be performed in the second lane change, a warning process (S208) illustrated in FIG. 17 is performed to the driver. In S1701, the driver is warned with a method illustrated in FIG. 8, as described in the first embodiment. In S1702, a target acceleration is computed so as to reduce a relative speed. For example, in a case that the lane change cannot be performed since the relative speed with the hypothetical vehicle is large, the vehicle speed can be increased up to the speed that enables the lane change in the above process.

As described above, when it is determined that the lane change cannot be performed in the second lane change possibility determination, by controlling the acceleration, the relative speed becomes smaller and the required detection distance can be made smaller. As a result, a change is made in the second lane change possibility determination so that the lane change can be performed. In other words, by the vehicle manufacturing system according to the preset embodiment, a possibility of automatic lane change can be improved.

Fourth Embodiment

The present embodiment is a vehicle control system for traveling as temporarily straying into the opposite lane (perform a temporal lane change) to avoid an obstacle ahead in the lane of a two-lane street. Regarding the parts having the same function as those in the first embodiment, the explanation thereof will be omitted.

Figure 18:
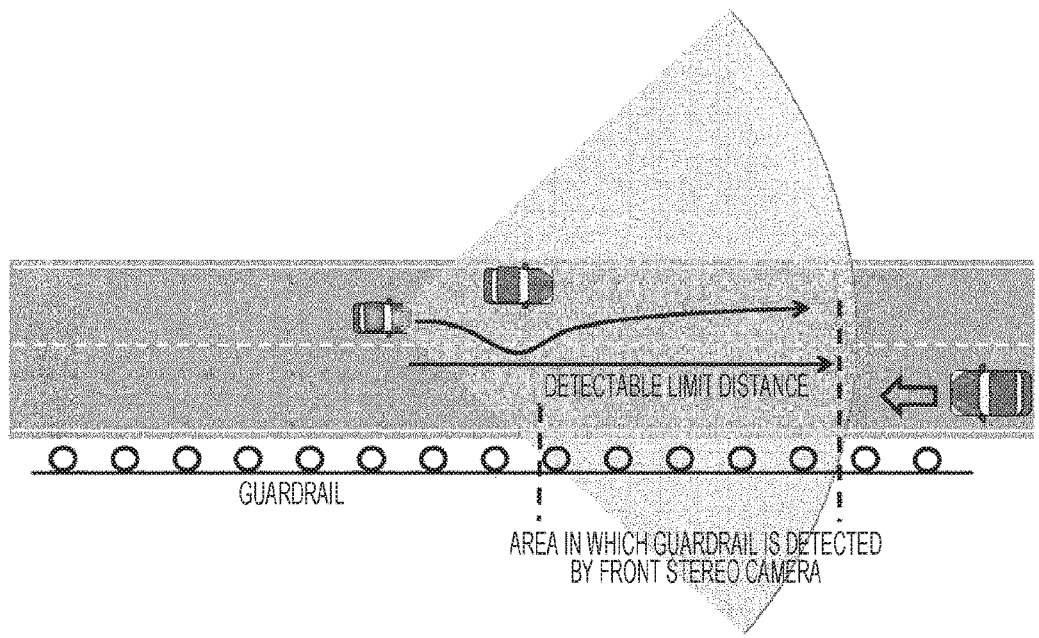
FIG. 18 is a diagram illustrating a detectable limit distance setting method according to the fourth embodiment.

FIG. 18 illustrates a detectable limit distance setting method according to the fourth embodiment. When it is determined that another vehicle is not detected, as illustrated in FIG. 18, farthest subject among the sequentially detected subjects by the sensors (including road surface painting) is set as a detectable limit distance. In FIG. 18, the farthest position of the detected guardrail is set as the detectable limit distance.

Figure 19:
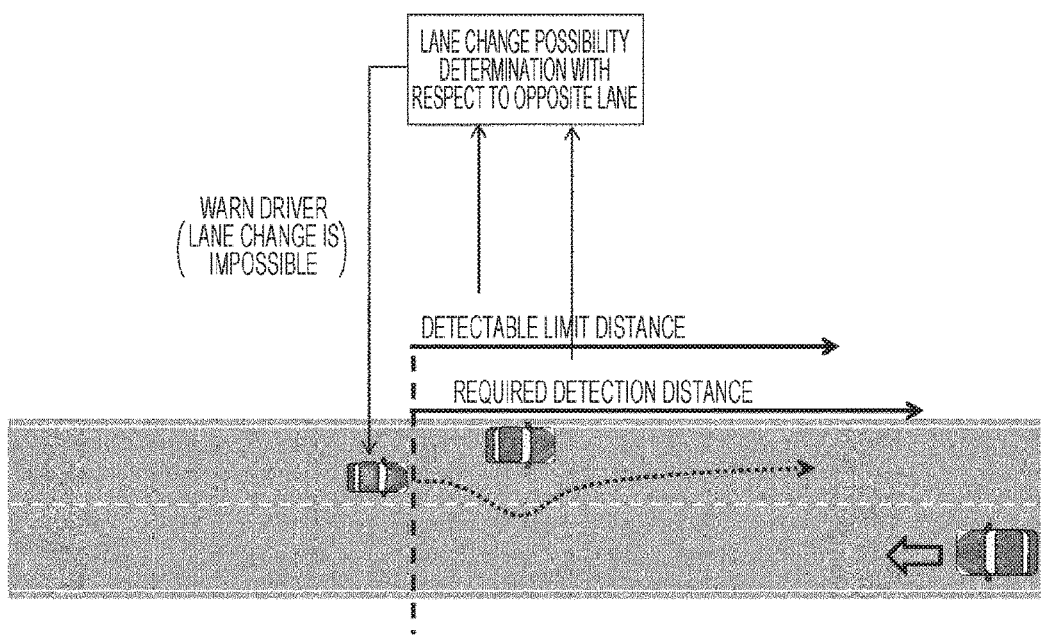
FIG. 19 is a diagram illustrating an operation result of the vehicle control system according to the fourth embodiment.

FIG. 19 illustrates an operation result of the vehicle control system according to the fourth embodiment. It is determined whether a temporal lane change to the opposite lane can be performed based on a required detection distance obtained from the detectable limit distance and a maximum relative speed between the host vehicle and hypothetical vehicle traveling in an opposite direction. In a case of FIG. 19, since the required detection distance is larger than the detectable limit distance, it is determined that the temporal lane change to the opposite lane cannot be performed, and the driver is notified that the lane change cannot be performed. In this case, when the vehicle is decelerated, the maximum relative speed is reduced and a process to enable the lane change is turned on, so that the automatic lane change is performed in more situations.

As described above, according to the present invention, it is determined whether or not the lane change can be performed based on the detectable limit distance and required detection distance and, when it is determined that the detectable limit distance is smaller than the required detection distance, that is, when the safety cannot be confirmed, the driver is warned without performing the lane change. As a result, in a case of the lane change to the opposite lane, when another vehicle traveling the lane to which the host vehicle is about to travel rapidly approaches from outside the detectable limit distance, the driver is notified that the lane change cannot be performed without forcing to perform the lane change. As a result, even in a case that another vehicle traveling in the destination lane of the lane change rapidly approaches from outside the detectable limit distance, the safety of the vehicle control system can be improved since the host vehicle performs the lane change without contacting with the following vehicle or forcing the following vehicle to decelerate rapidly.

Fifth Embodiment

The present embodiment is a vehicle control system for making an automatic left turn from a side street to a main street. Regarding the parts having the same function as those in the first embodiment, the explanation thereof will be omitted.

Figure 20:
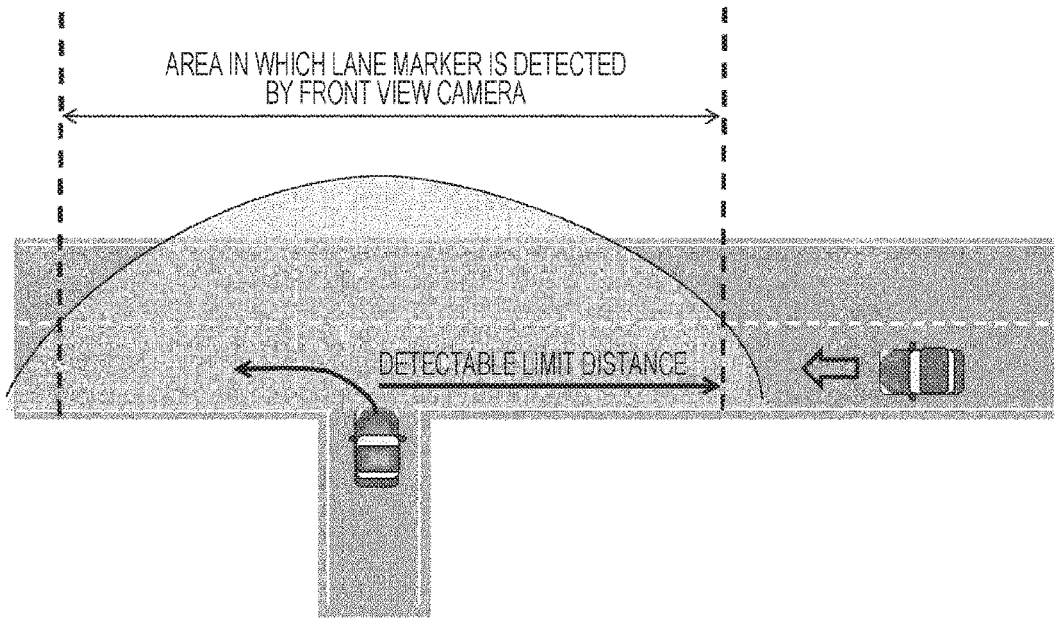
FIG. 20 is a diagram illustrating a detectable limit distance setting method according to the fifth embodiment.

FIG. 20 illustrates a detectable limit distance setting method according to the fifth embodiment. When is determined that another vehicle is not detected, as illustrated in FIG. 20, a farthest subject among sequentially detected subjects by the sensors (including road surface painting) is set as a detectable limit distance. In FIG. 20, the farthest position of the seen lane markers is set as the detectable limit distance.

Figure 21:
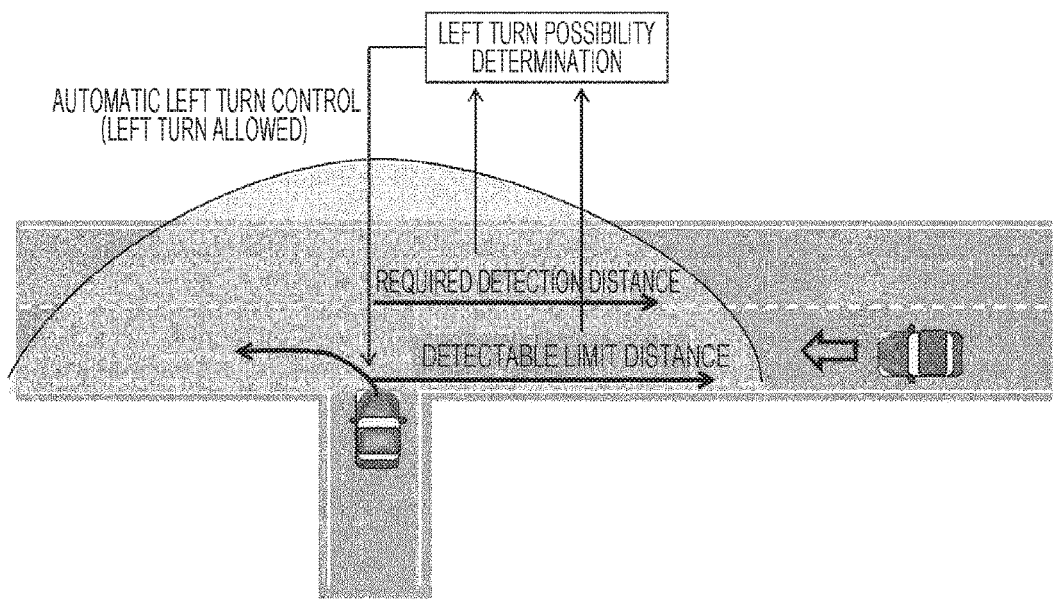
FIG. 21 is a diagram illustrating an operation result of the vehicle control system according to the fifth embodiment.

FIG. 21 illustrates an operation result of the vehicle control system according to the fifth embodiment. As illustrated in FIG. 21, it is determined whether or not a left turn can be performed based on the detectable limit distance and a required detection distance obtained from a maximum relative speed of another vehicle (a hypothetical vehicle) traveling in the lane to which the host vehicle is about to make a left turn. In the case of FIG. 21, since the detectable limit distance is larger than the required detection distance, it is determined that the left turn can be performed, a target steering torque to make the left turn is generated, and an automatic left turn control is executed.

Here, the fifth embodiment describes the vehicle control system for automatically making a left turn from a side street to a main street; however, the system is effective for a right turn at or traveling straight through other intersections or an intersection with a traffic signal. In other words, the control unit of the vehicle control device 1 according to the present embodiment, it is determined that a right turn or a left turn can be made based on the relative speed calculated by the relative speed calculation unit and the determination result is notified to the driver, or when it is determined that the turn can be made, the vehicle is controlled to automatically making a right or left turn.

As described above, according to the present invention, it is determined whether or not the lane change can be performed based on the detectable limit distance and required detection distance, and when it is determined the detectable limit distance is smaller than the required detection distance, that is, when the safety cannot be confirmed, the driver is notified that the lane change cannot be performed without forcing to perform the lane change. As a result, even in a case that a following vehicle traveling in a destination lane of the lane change rapidly approaches from outside the detectable limit distance, the vehicle does not perform the lane change and avoid to contact with the following vehicle or forcing the following vehicle to decelerate rapidly so that the safety of the vehicle control system can be improved.

The embodiments have been described; however, the specific configuration is not limited to those embodiments and design modifications or the like within the scope of the invention may be included in the present invention.

REFERENCE SIGNS LIST

0 . . . vehicle control system, 1 . . . vehicle control device, 2 . . . stereo camera, 3, 4 . . . laser radar, 5 . . . miliimeter wave radar, 6 . . . steering wheel, 7 . . . steering torque detection device, 8 . . . steering control device, 9 . . . motor, 10 . . . steering control mechanism, 11 . . . automatic lane change input device, 12 . . . brake pedal, 13 . . . brake control mechanism, 14 . . . combined sensor, 15 . . . brake control device, 16FL to 16RR . . . wheel cylinder, 17 . . . accelerator pedal, 18 . . . stroke sensor, 19 . . . throttle control device, 20 . . . throttle control mechanism, 21 . . . steering wheel angle detection device, 22FL to 22RR . . . wheel speed sensor, 23 . . . alarm devic.

The invention claimed is:

1. A vehicle control system of a vehicle, comprising:
a vehicle controller;
an external recognition means for detecting a lane marker of a lane in which the vehicle is traveling and/or detecting another vehicle in a surrounding area of the vehicle, wherein the vehicle control system is configured to determine a detectable limit distance of the external recognition means, wherein
the vehicle controller is configured to calculate a speed relative to a hypothetical vehicle present outside the detectable limit distance when no other vehicle is present within the detectable limit distance,
the vehicle controller is also configured to determine a required detection distance of the external recognition means required for the vehicle to change lanes on the basis of the relative speed,
when it is determined that the detectable limit distance is smaller than the required detection distance, the driver is notified that the lane change cannot be performed,
when it is determined that the detectable limit distance is larger than the required detection distance, an automatic lane change of the vehicle is performed, and
the vehicle control system is also configured to detect a plurality of objects, which are sequentially detectable from the vehicle, and, based on the objects, the detectable limit distance is set in a vicinity of a farthest object.

2. The vehicle control system according to claim 1, wherein, when it is determined that the detectable limit distance is smaller than the required detection distance, the vehicle is accelerated.

3. The vehicle control system according to claim 1, wherein the vehicle controller calculates the speed relative to the hypothetical vehicle based on a speed limit of the lane.

4. The vehicle control system according to claim 1, wherein the vehicle controller calculates the speed relative to the hypothetical vehicle based on traveling speed history data of the lane.

5. The vehicle control system according to claim 1, wherein the vehicle control system is also configured to extract objects having brightness equal to or lower than a predetermined value from the objects, and sets the detectable limit distance based on one of the objects having brightness equal to or lower than the predetermined value.

6. The vehicle control system according to claim 1, wherein, when it is determined the detectable limit distance is smaller than the required detection distance, timing to turn on a direction indicator is set earlier.

7. A vehicle control system of a vehicle, comprising:
an external recognition unit configured to detect outside environment information of the vehicle;
a vehicle controller that is configured to calculate a relative speed between a hypothetical vehicle outside a detectable area and the vehicle when any other vehicle is not recognized in the detectable area by the external recognition unit; and
a notification unit configured to determine whether or not a right turn, a left turn, or a lane change can be performed based on the relative speed calculated by the vehicle controller and notify the driver of the determination result, wherein
when it is determined that the detectable limit distance is larger than the required detection distance, an automatic lane change of the vehicle is performed, and
the vehicle control system is also configured to detect a plurality of objects, which are sequentially detectable from the vehicle, and, based on the objects, the detectable limit distance is set in a vicinity of a farthest object.

8. A vehicle control system according to claim 7, wherein the vehicle controller is also configured to calculate an area detectable by the external recognition unit; and further comprising
an another vehicle recognition unit configured to recognize another vehicle based on whether or not there is any other vehicle in the detectable area calculated by the vehicle controller.

9. The vehicle control system according to claim 7, wherein the vehicle controller is also configured to calculate a required detection distance of the external recognition unit required for the lane change by the vehicle, based on the relative speed calculated by the relative speed calculation unit,
wherein, when it is determined that the required detection distance is smaller than a limit of the detectable area of the external recognition unit, the notification unit notifies the driver that the lane change cannot be performed or is risky.

10. The vehicle control system according to claim 7, wherein the vehicle controller is also configured to calculate a required detection distance of the external recognition unit required for the lane change by the vehicle, based on the relative speed calculated by the relative speed calculation unit; and further comprising
a lane change control unit configured to automatically perform the lane change of the vehicle when it is determined that the required detection distance is larger than a limit of the detectable area of the external recognition unit.

11. The vehicle control system according to claim 7, wherein the vehicle controller is also configured to
calculate a required detection distance of the external recognition unit required for the lane change by the vehicle based on the relative speed calculated by the relative speed calculation unit; and
control to accelerate the vehicle when it is determined that the required detection distance is larger than a limit of the detectable area of the external recognition unit.

12. The vehicle control system according to claim 7, wherein the vehicle controller is also configured to control to accelerate the vehicle when it is determined that the lane change can be performed based on the relative speed calculated by the vehicle controller.

13. The vehicle control system according to claim 7, wherein the vehicle controller calculates the relative speed between the hypothetical vehicle and the vehicle based on a speed limit of the lane.

14. The vehicle control system according to claim 7, wherein the vehicle controller calculates the relative speed between the hypothetical vehicle and the vehicle based on a traveling speed history of the lane.

15. The vehicle control system according to claim 7, wherein
among recognition targets recognized by the external recognition unit, a vicinity of a farthest recognition target is set as a limit of the detectable area of the external recognition unit, and
it is determined whether or not a lane change can be performed, based on a limit of the detectable area of the external recognition unit.

16. The vehicle control system according to claim 7, wherein the vehicle controller is also configured to calculate a required detection distance of the external recognition unit required for the lane change by the vehicle, based on the relative speed calculated by the relative speed calculation unit,
wherein
among recognition targets recognizable by the external recognition unit, a vicinity of a farthest recognition target is set as a limit of the detectable area of the external recognition unit, and
when it is determined that the required detection distance is larger than a limit of the detectable area of the external recognition unit, it is determined that the vehicle can change the lane.

17. A vehicle control system of a vehicle, comprising:
an external recognition unit configured to detect outside environment information of the vehicle;
a vehicle controller that is configured to calculate a relative speed between another vehicle and the vehicle when the external recognition unit recognizes the another vehicle; and
a notification unit configured to determine whether or not a right turn, a left turn, or a lane change can be performed based on the relative speed calculated by the vehicle controller and notify the determination result to the driver of the vehicle, wherein when it is determined that the detectable limit distance is larger than the required detection distance, an automatic lane change of the vehicle is performed, and the vehicle control system is also configured to detect a plurality of objects, which are sequentially detectable from the vehicle, and, based on the objects, the detectable limit distance is set in a vicinity of a farthest object.

18. The vehicle control system according to claim 17, wherein, when the external recognition unit does not recognize any other vehicle in the detectable area, a relative speed between a hypothetical vehicle outside the detectable area and the vehicle is calculated, it is determined whether or not a lane change can be performed based on the calculated relative speed, and the determination result is notified to the driver.

* * * * *